Feb. 12, 1963 L. A. RUSSELL 3,077,583
MAGNETIC CORE FLUX STEERING DEVICE
Filed Dec. 30, 1957 6 Sheets-Sheet 1

INVENTOR
LOUIS A. RUSSELL
BY William V Schelberg
AGENT

Feb. 12, 1963 L. A. RUSSELL 3,077,583
MAGNETIC CORE FLUX STEERING DEVICE
Filed Dec. 30, 1957 6 Sheets-Sheet 3
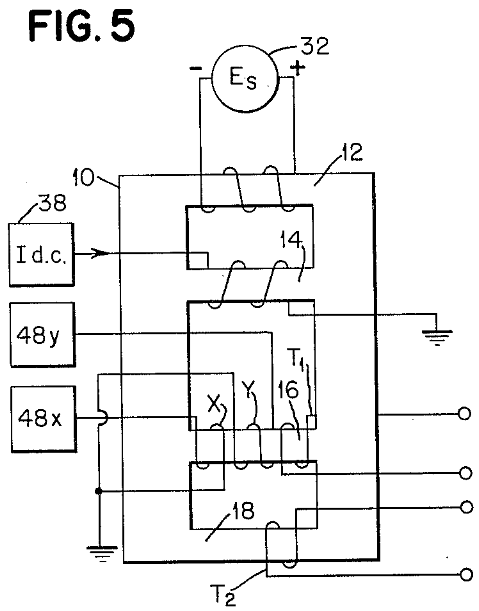
FIG. 8
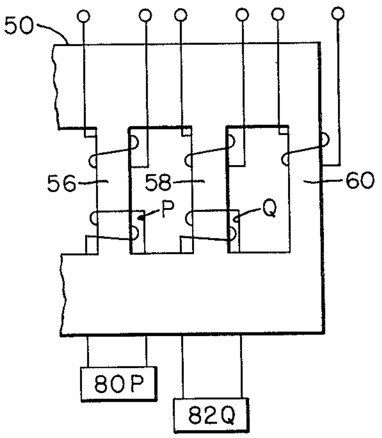
FIG. 6
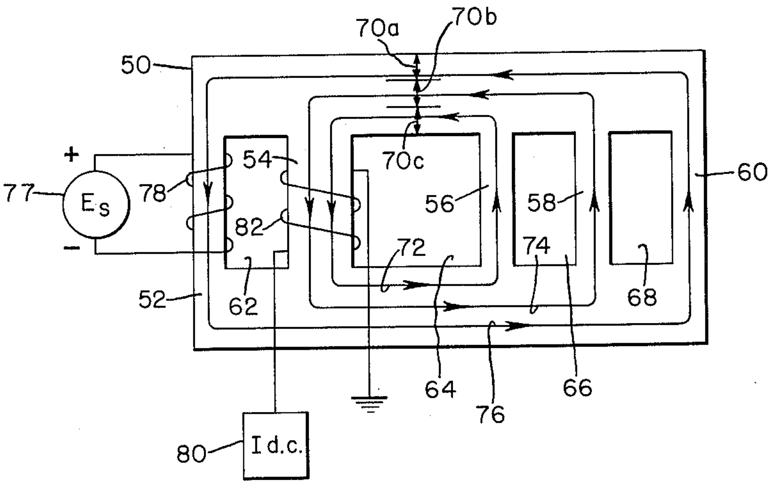

MAGNETIC CORE FLUX STEERING DEVICE

Feb. 12, 1963 L. A. RUSSELL 3,077,583

MAGNETIC CORE FLUX STEERING DEVICE

Filed Dec. 30, 1957 6 Sheets-Sheet 6

United States Patent Office 3,077,583 Patented Feb. 12, 1963

3,077,583
MAGNETIC CORE FLUX STEERING DEVICE

Louis Allen Russell, Poughkeepsie, N.Y., assignor to International Business Machines Corporation, New York, N.Y., a corporation of New York Filed Dec. 30, 1957, Ser. No. 706,179
9 Claims. (Cl. 340—174)

This invention relates to magnetic core switching devices and more particularly to logic devices wherein a plurality of magnetic flux paths are employed. Devices utilizing a multiplicity of flux paths have been employed heretofore with such flux paths provided by a core which has a plurality of openings pierced therethrough to divide the core structure into several sections. Examples of such structures and circuitry wherein they have been used are disclosed in the copending application Serial Number 546,180, filed November 10, 1955, in behalf of Lloyd P. Hunter, now Patent No. 2,869,112 and in the copending application Serial Number 608,227 and Serial Number 613,952, now Patent No. 2,992,415, filed, respectively, on August 30, 1956, and December 4, 1956, in behalf of Edwin Bauer, which applications are assigned to the same assignee.

Multipath magnetic core structures provide a plurality of flux paths which may jointly or severally be linked by input and output winding arrangements wherein energization of certain windings selectively and in predetermined combinations may be utilized to perform a large variety of separate and/or related logical functions. In the above cited copending applications, the circuitry is directed to development of an output signal indicative of the logical combination of two or more inputs, or of a single input which may be quantified by different amounts. The present invention comprises an improvement over the aforementioned applications in that a mode of operation hereafter termed flux switching is employed which allows performance of logical operations not heretofore realized and wherein the multiple flux paths are utilized to produce logical outputs indicative of various combinations of any number of inputs.

Accordingly, one broad object of this invention is to provide improved magnetic core circuitry for performing logical switching operations.

A further object is to provide improved multipath magnetic core circuitry operable in a novel and improved manner.

A still further object is to provide a universal logical circuit element employing multiple magnetic flux paths.

Another object is to provide circuitry having a plurality of magnetic paths capable of producing outputs indicative of both commutative and non-commutative logical operators for a plurality of input variables.

Still, another object of this invention is to provide a logical apparatus utilizing flux switching magnetic structures having two flux paths of unequal reluctance hereafter referred to as Bi-path Steerage Operators and having three flux paths of unequal reluctance hereafter referred to as Tri-path Steerage Operators.

Still other objects will be pointed out in the following description and claims and illustrated in the accompanying drawings, which disclose, by way of example, the principle of the invention and the best mode, which has been contemplated, of applying that principle.

In the drawings:

FIG. 5 is another embodiment of this invention representing a sophistication of input and output windings to perform logical operations.

FIG. 6 is another embodiment of this invention representing another multi-legged magnetic core structure of a type which may further be utilized in practicing this invention.

FIGS. 8 and 9 are fragmentary schematics of the cores in FIG. 6 which represent different embodiments illustrating the manner in which a plurality of input and output windings may be coupled to obtain desired logical functions.

Figure 1:
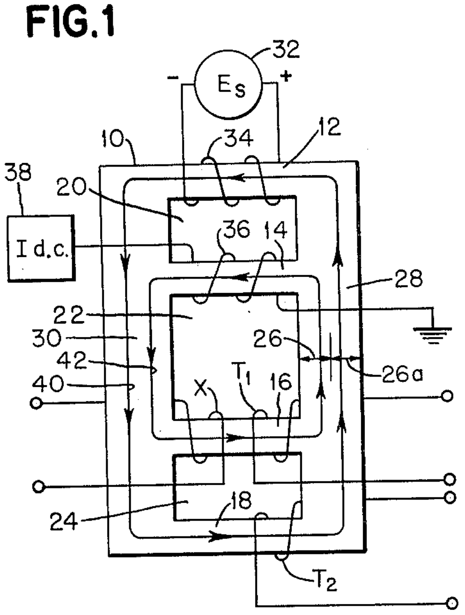
FIG. 1 is a representation of a multi-legged magnetic core structure of the type which may be utilized in practicing the invention.

Referring now to FIG. 1, the core structure illustrated has openings dividing each end thereof into two parallel legs, all of which are of equal cross-sectional area. The cross-sectional area of each side of the core intermediate the ends is at least equal to two times the area of one of the legs. The core structure provides two flux paths of unequal length, and therefore, of unequal reluctance, with each path including one of the legs at each end of the core. In the figure, the upper legs are arbitrarily referred to as control legs, while the lower legs are referred to as data legs, or more broadly as data paths. These paths are hereafter referred to as being switched when the magnetic material in a designated path has attained a different direction of magnetic flux density from a datum direction, or vice versa. A direct current source is coupled to a winding on one of the control legs to keep the flux in this leg in a direction from right to left at all times. An alternating control clock source is coupled to the other control leg and functions to periodically switch the flux in this leg from a normal or right to left direction to a reversed direction and thereafter back to the normal direction in each cycle of operation of the clock source. Since the cross-sectional area of each of the two control legs is equal to or less than one half that of the sides of the core and is formed of material having substantially rectangular hysteresis characteristics, wherein the amount of flux reversal which can be accomplished by the clock source in energizing the winding means on the control leg is quantified. As a result, since in any given cycle only one control leg has the flux therein reversed, only one data leg at the other end of the core may be reversed. Since flux will choose the path of least reluctance, logic dictates that upon reversal of the unbiased control leg, the flux will reverse in the innermost one of the lower legs. It is this behavior of flux in selecting the path of least reluctance which is utilized to perform logic in accordance with the invention as is described hereafter in detail.

An input winding on one data leg, when energized by an information input, biases that leg so as to increase its reluctance and therefore prevent any change in flux direction therein and, since balance of flux direction must be maintained within the structure, a flux reversal is steered to the other data leg which may have otherwise had a higher reluctance. Upon restoration of flux direction in the control leg by the clock source, one, or the other data leg if there is not input, is reset and an output is developed in one of the two output windings that may be provided on the data legs. This type of core structure with operation as described for the two paths of unequal reluctance, may be termed a Bi-path Steerage Operator. The basic operational concept is to supply a mmf in a circuit wherein the first path has less reluctance than the other and, in accordance with predetermined logic, either allow the first path to switch or to bias that path to steer the flux reversal to the next path of least reluctance. Extension of the flux steering principle beyond that of the core structure shown in FIG. 1, in that three data legs are utilized, is shown in FIGURE 6 and is described in detail hereafter. Briefly, this type of structure may be termed as a Tri-path Steerage Operator in that there are three data paths in which switching may take place. With inputs applied to the first and second data legs and sophistication of the output windings various logical functions may be realized.

Figure 2:
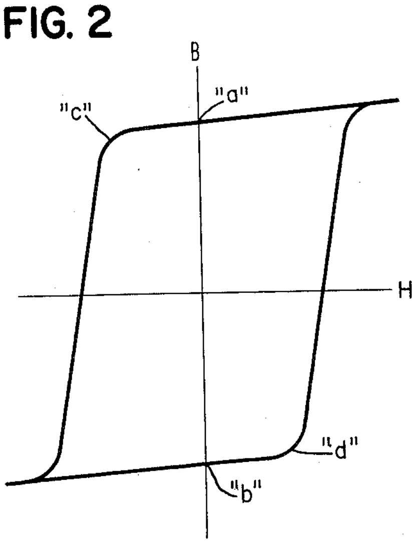
FIG. 2 is a plot of flux density (B) versus magnetic field intensity (H) for a magnetic material such as might be employed in the core structures of the invention.

Again referring to the embodiment depicted in the FIG. 1, the multipath structure is designated as element 10 and is formed from a material known in the art as "square loop" type magnetic material whose characteristic curve is substantially as shown in FIG. 2. This curve is a plot of flux density (B) versus magnetic field intensity (H) and exhibits two limiting states of flux remanence designated "*a*" and "*b*" while the "knees" of the loop are designated "*c*" and "*d*."

The core 10 shown in FIGURE 1 has four parallel legs labeled 12, 14, 16 and 18 which are separated by openings designated 20, 22, and 24. The core 10 may then be considered as having two parallel paths 26 and 26*a*, which paths are separated at the top by opening 20 and at the bottom by opening 24. The cross sectional area of each of the legs is essentially the same and is equal to or less than one half of the cross sectional area of either of the side sections of the core which are designated 28 and 30. Because of the two parallel legs at either end of the core, this type structure is referred to as a four legged core.

Figure 13:
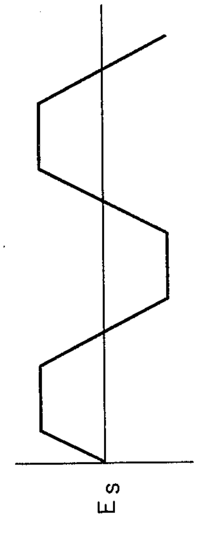
FIG. 13 illustrates substantially the voltage applied by the alternating clock source shown in the FIGS. 1, 4, 5, 6, 10 and 11.

The core 10 is provided with an alternating clock source 32 connected with a winding 34 on the leg 12 and the waveform generated by the clock source 32 is shown in the FIG. 13. A further winding 36 on the leg 14 is connected with a constant direct current bias source 38 which serves to saturate the leg 14 with flux arbitrarily chosen in a direction from right to left hereinafter referred as as "West." An input winding X and an output winding $T_1$ each link the leg 16, while an output winding $T_2$ links the leg 18. Initially, the flux in the legs 12 and 14 may be arbitrarily designated as traveling from right to left or West, with the flux in the legs 16 and 18, traveling from left to right, hereinafter referred to as "East," and is as indicated by the arrows on lines 40 and 42. As explained in an application Serial Number 685,128, filed September 20, 1957, on behalf of Newton F. Lockhart, now Patent No. 2,978,176 which is assigned to the same assignee, if a flux reversal were to take place in any one of the legs 12 or 14, a corresponding flux reversal takes place in the shortest flux path and an mmf sufficient to switch any one of the legs 12 or 14 will reverse only that amount of flux associated with the particular leg regardless of any additional magnetizing force applied to that leg.

Figure 3A:
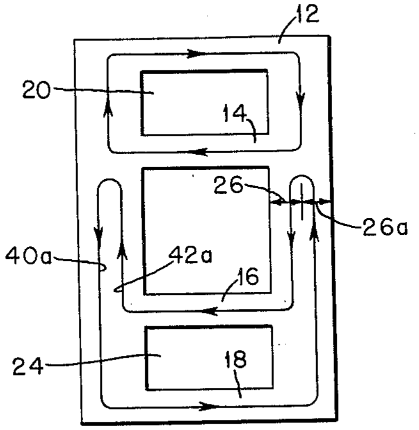
FIGS. 3A and 3B are diagrammatic representations of flux patterns achieved in the core structure of FIG. 1 in response to the application of different magnetization forces applied thereto.

Operation is divided into input and output time. During input time, the output of the control clock source 32 is negative for the flux orientation selection, causing the leg 12 to reverse the flux direction from West to East. The D.C. bias source 38 energizing the winding 36 on the leg 14 keeps the flux in this leg in the West direction at all times. This flux reversal in leg 12 causes a flux orientation in a clockwise direction in a closed path about the opening 20 and a "kidneying" of the flux initially oriented in paths 26 and 26*a*. Since the inner path is shorter, a flux reversal is accomplished in the leg 16 and this change in flux orientation is shown in FIG. 3A with the direction as indicated by the arrows on the lines 40*a* and 42*a*. During output time, the output of the control clock source 32 is positive and resets the flux in leg 12 to West. The reversal of the flux in the leg 12 then reorients the flux in the core 10 to the initial state as shown by the arrows on the lines 40 and 42. The reorientation of the flux in the core 10 necessarily switches the flux in the leg 16 from West back to East and in so doing induces a voltage in the output winding $T_1$. If, during input time, an information input signal is introduced to the input winding X such that an mmf is applied in the leg 16 which keeps the leg 16 from switching, the flux direction in the leg 18 switches from East to West and the field is oriented as shown in the FIG. 3B, the arrows on the lines 40*b* and 42*b* showing their direction. As shown in the FIG. 3B, the flux is oriented in a clockwise direction on a closed loop about the opening 20 as above recited and again causes a "kidneying" of the flux initially oriented in the paths 26 and 26*a* with a flux reversal in the path 26*a* linking the leg 18. When the control clock source 32 is positive the leg 12 is switched from East to West to cause a reversal of the flux in the leg 18 from West to East and orientation of the lines of flux as initially indicated and shown in the FIG. 1. Reversal of the flux in the leg 18 induces a voltage in the winding $T_2$ associated with this leg at output time. It is apparent that outputs are realized in the windings $T_1$ and $T_2$, depending upon the availability of an information input to the winding X at input time, as well as output time, since there is a flux change which induces a voltage in the determined output winding. The outputs during input time may be eliminated by connecting a uni-directional element with each of the windings $T_1$ and $T_2$, such as a diode, or a saturable reactor. This same technique may be applied to suppress spurious pulses on the input winding X occurring during output time. The presence or absence of an information signal to the input winding may be then thought of as "steering" the flux to one or the other of the lower legs.

Figure 4:
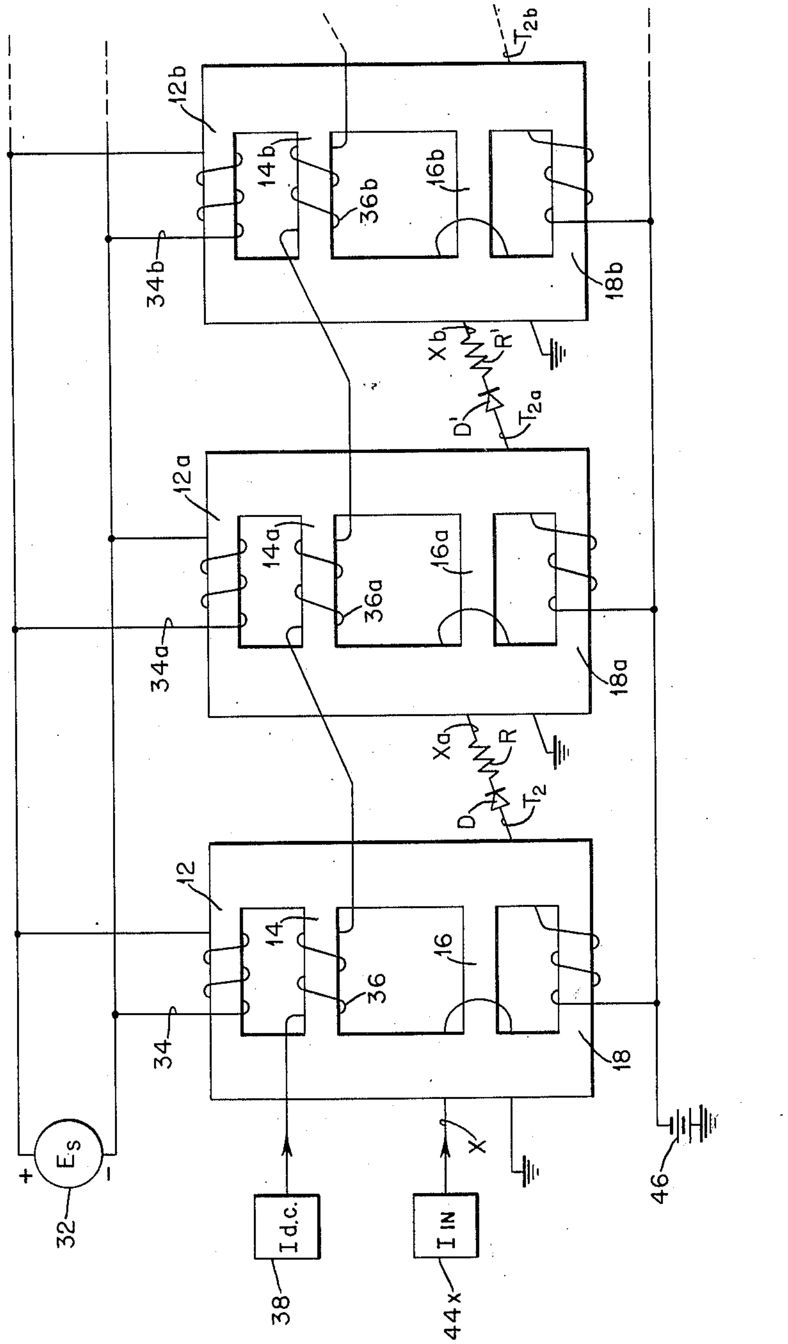
FIG. 4 is a representation of another embodiment of this invention utilizing the core structure in accordance with the principles of this invention to make up a shift register.

The FIG. 4 shows the core structure 10 of the previous FIG. 1 connected with similar cores to perform the operation of a shift register. The input is supplied to the circuit by the information signal source 44*x* coupled to the winding X which information source, when in an operative state, causes a current flow in the direction indicated. The control clock source 32 is connected with the winding 34, 34*a* and 34*b* *on* each of the cores shown which windings are on the legs 12, 12*a* and 12*b*, respectively, and similarly the constant control current bias source 38 is connected with each of the windings 36, 36*a* and 36*b* on the legs 14, 14*a* and 14*b*, respectively. The output winding $T_2$ on the leg 18 has one of its ends connected to ground through a battery 46 and the other connected to a diode D and a resistor R which is further connected with the input winding X*a* on the leg 16*a*. Similarly, the winding $T_{2a}$ on the leg 18*a*, has one end connected with ground through the battery 46 and the other connected with another diode D′ and a resistor R′ which is further connected with the input winding X*b* on the leg 16*b*. It is apparent that the output winding $T_1$ is not utilized in this embodiment, the reasons therefore will become apparent in the discussion below.

With the flux direction in the legs 12, 12b, 14, 14a and 14b assumed to be West, the flux in the lower legs 16, 16b, 18, 18a and 18b is East, this orientation being like that as shown in FIG. 1 while the flux orientation in the leg 12a is assumed to be East and that in leg 16a is assumed to be West. During input time, the output of the control clock source 32 is negative causing the flux in legs 12, and 12b to switch from West to East and leg 12a to be switched to the West direction. Again, there is no flux reversal in the leg 14, 14a or 14b due to the constant control bias applied to each of the legs from the source 38. Since the next shortest distance is found in the first of the lower legs, each of the legs 16 and 16b are switched from East to West, while the leg 16a switches from West to East with the orientation of the flux the same as shown in FIG. 3A for the legs 12 and 12b and as shown in FIG. 1 for leg 12a. During output time, the output of the control clock source 32 is positive so as to reset the legs 12 and 12b from East to West, while switching the flux direction in the leg 12a from West to East. This causes a reversal of flux direction in the legs 16 and 16b from West to East and in 16a from East to West. Since there was no information input available, there is an absence of an output, and the register is ready for the next cycle of operation.

Figure 3B:
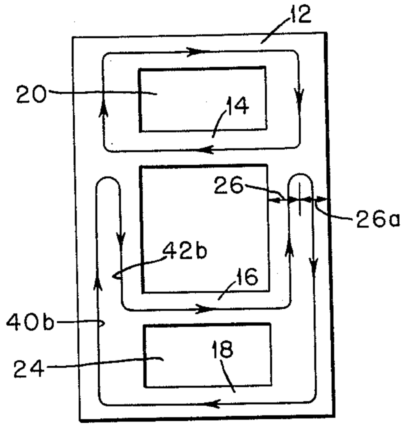

Assume an input is available from the information source 44x to the winding X during input time. The input then saturates the leg 16 with flux in the East direction. This input then "steers" the flux reversal into the leg 18, which switches the flux in the leg 18 from East to West and the flux is then oriented as shown in FIG. 3B. During output time, the control clock source 32 output is positive which switches the flux in leg 12 from East to West and the flux in the leg 18 from West to East to return the flux orientation to that shown in FIG. 1. The flux in leg 18 in switching from West to East induces a voltage in the output winding $T_2$ on the leg 18, which voltage is delivered to the winding Xa through the diode D and the resistor R. As described above, the leg 12a was switched from West to East which in turn tends to switch the flux in the leg 16a from East to West at this time. The output generated to the winding Xa on the leg 16a induces a counter mmf which opposes any flux reversal in this leg and accordingly steers flux reversal to take place in the leg 18a. It can be seen that when the control source 32 reverses its polarity, the information will be further transferred via the input winding Xb on the leg 16b on the succeeding core.

The combination of the battery 46 and the diode D as shown is utilized to allow only full outputs to be transferred as more fully explained and claimed in a copending application Serial Number 290,677 filed May 29, 1952, on behalf of Munro K. Haynes, now Patent No. 2,966,661 which is assigned to the same assignee. It should be noted in passing that if the alternate windings 34 and 34a are connected in the same sense to the control source 32, a transfer circuit, such as that described and claimed in a copending application Serial Number 528,594 filed August 16, 1955, on behalf of Louis A. Russell, now Patent No. 2,907,987, assigned to the same assignee, may be connected with the output windings $T_2$, $T_{2a}$ and $T_{2b}$.

Another embodiment of this invention is the utilization of the core 10 to perform various commutative and non-commutative logical functions. A discussion of commutative functions is included in a copending application Serial Number 611,922 filed on September 25, 1956, now Patent No. 3,028,088, in behalf of Bradford Dunham and assigned to the assignee of this application. In this copending application circuitry is shown for realizing sixteen possible logical commutative and non-commutative operators which can be realized from two input variables.

In accordance with the logical operators referred to above, and referring to FIG. 5, the core 10 is shown with the addition of a selectively operable information input source 48y connected with a winding Y wound on the leg 16, and a selectively operable information input source 48x connected with a winding X on the leg 16. Referring to an input as 1 and the absence thereof as 0, the same symbol may be referred to denoting an output on either of the output windings $T_1$ or $T_2$. An output therefore is denoted as a 1 and the absence thereof is denoted as a 0. The Table I is given below for the circuit arrangements described, wherein an input to either the winding X or Y is sufficient to steer the flux into the leg 18.

*Table I*

| Inputs | | Outputs | |
|---|---|---|---|
| X | Y | $T_1$ | $T_2$ |
| 1 | 1 | 0 | 1 |
| 0 | 1 | 0 | 1 |
| 1 | 0 | 0 | 1 |
| 0 | 0 | 1 | 0 |

If the output winding $T_1$ is utilized, the logical function of NEITHER NOR is realized symbolized by (↓). If the output winding $T_2$ is utilized, the logical function of "INCLUSIVE OR" is realized symbolized by ( $\vee$ ). With these two functions realized, they may be combined in various ways to produce all of the remaining binary functions. However, combination of these two functions necessitates the utilization of more circuitry and in some instances may be found burdensome and accordingly, the number of output legs may be increased to allow more combinations to achieve the desired logical functions.

Referring now to the FIG. 6, there is shown a core 50 having parallel legs 52, 54, 56, 58 and 60 each of which are separated by an opening pierced in the core and designated as 62, 64, 66 and 68. Each of the legs 52, 56, 58 and 60 are of equal cross sectional area, while the leg 54 has twice the cross sectional area of any one of the other parallel legs. The core may then be thought of as having three parallel paths 70a, 70b and 70c with the lines of flux within the core initially oriented as shown by the lines 72, 74 and 76 which depict a substantially clear version of their alignment. As shown, both of the lines 72 and 74 are directed through the leg 54 while the line 72 further links the output leg 56 in a closed loop through the path 70c and the line 74 further links the output leg 58 in a closed loop through the path 70b. The line 76 links the leg 52 and the output leg 60 in a closed loop through the path 70a. A control clock source 77 is connected with a winding 78 on the leg 52 and a direct current bias source 80 is connected with a winding 82 on the leg 54. As before, the function of the bias source 80 is to apply sufficient current to the winding 82 to saturate the leg 54 so that the direction of flux in this leg will always remain the same.

Figure 7A:
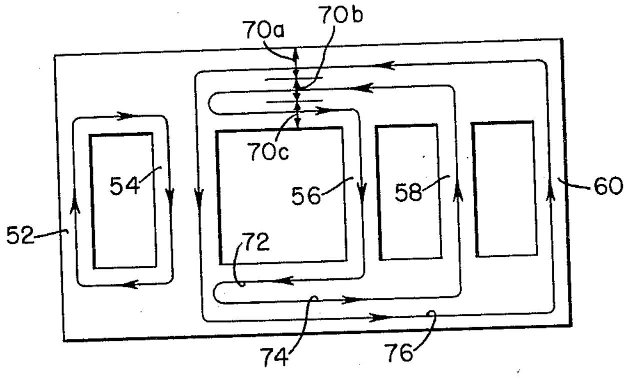
FIGS. 7A, 7B and 7C are representations of the flux patterns achieved in the core structure of FIG. 6 in response to the application of different magnetizing forces applied thereto.
Figure 7B:
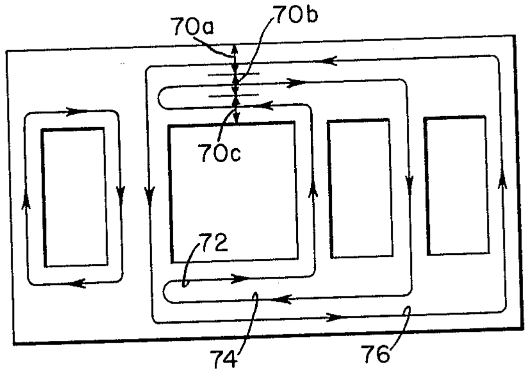
Figure 7C:
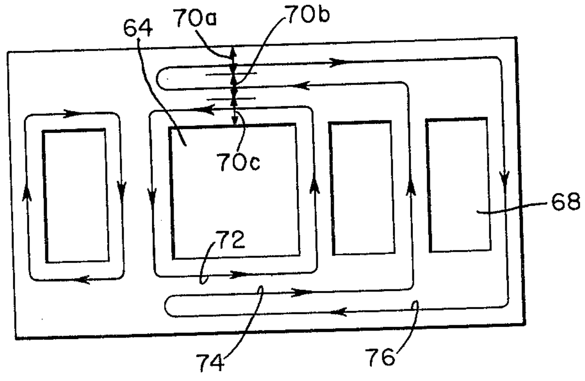

Operation is again divided into input and output time. When the output of the control clock source 77 is negative, the flux in the leg 52 reverses and the orientation is as shown by the arrows on the lines 72, 74 and 76 in the FIG. 7A. Referring to FIG. 7A, it can be seen that the lines 72 and 74 in the paths 70b and 70c "kidney," to cause a flux reversal in the leg 56, while the line 76 links the leg 54 and 60 through the path 70a. If however, an mmf. were applied to the leg 56 such as to oppose the reversal of flux direction, then the reversal of flux would take place in the leg 58 and the field orientation would assume a configuration similar to that shown in FIG. 7B. Referring to the FIG. 7B, the lines 72 and 74 in the paths 70b and 70c "kidney" as in the previous case, however, the direction of the flux, as indicated by the arrows, shows that the flux in the leg 58 has switched, with that in leg 56 remaining the same due to the application of an opposing field and the flux through the path 70a again linking the legs 54 and 60 in a closed loop. Assume that during input time, when the mmf is applied to the leg 56, a similar opposing mmf. is applied simultaneously to the leg 58. The flux orientation would then assume a configuration similar to that shown in the FIG. 7C. Referring to the FIG. 7C, the flux in the path 70c links the legs 54 and 56 in a closed loop encircling the opening 64 as shown by the line 72 in a direction as indicated by the arrows. The flux in the path 70a and 70b indicated by the lines 74 and 76, "kidney" to form a closed loop encircling the opening 68 as indicated by the arrows. The flux in the leg 60 has thus been reversed due to the simultaneous action of an opposing field applied to each of the legs 56 and 58. It follows from this, and the discussion above concerning the field or orientation of the five legged core 50 that depending upon the application of an opposing field, the flux reversal may be steered from one leg to another. Similarly, the same methods may be employed in a core having "N" data legs as long as the biased leg, or legs, shown as leg 54 in the FIG. 6, has approximately a cross sectional area equal to N–1 data legs. In passing it is seen fit to mention that during input time, an opposing field applied to the leg 58 or the leg 60 individually or simultaneously will have no effect other than to drive the particular leg further into magnetic saturation. Similarly, when an opposing field is applied to the leg 56 which steers the flux change into the leg 58, a coincidently applied field to the leg 60 will have no effect that is, other than to drive the leg 60 further into magnetic saturation.

Referring to FIG. 8, the right hand portion of the core 50 is shown which depicts the three data legs 56, 58 and 60, with an information winding P on the leg 56 connected with an input signal source 80P and an information input winding Q on the leg 58 connected with an input signal source 82Q. By placing a signal output winding on each of the legs, or having a single output winding linking two of the output legs in combination various logical functions may be achieved. A Table II is shown below, in which the numeral 1 denotes the presence of an input to the particular input winding and the numeral 0 denotes its absence. Similarly, the numeral 1 denotes the presence of a change and hence a signal output in a winding linking the particular leg. Where an output winding is denoted linking two of the legs, it is understood to mean that the winding links each of the legs noted, series aiding.

*Table II*

| Inputs | | Legs having an output winding | | | | | |
|---|---|---|---|---|---|---|---|
| P | Q | 56 | 58 | 60 | 56 58 | 56 60 | 58 60 |
| 1 | 1 | 0 | 0 | 1 | 0 | 1 | 1 |
| 0 | 1 | 1 | 0 | 0 | 1 | 1 | 0 |
| 1 | 0 | 0 | 1 | 0 | 1 | 0 | 1 |
| 0 | 0 | 1 | 0 | 0 | 1 | 1 | 0 |

The output winding on leg 56 alone accomplishes the logical function of NOT P since an output is sensed whenever the P input is not present. The winding on leg 58 accomplishes the logical function of NOT IF THEN since an output is not sensed in every case except if the P input is present alone. Similar analysis may be seen to apply to each of the output winding configurations and the logical functions accomplished in order are; AND; NOT BOTH; IF THEN and singularly NO INVERSION or P.

Figure 9:
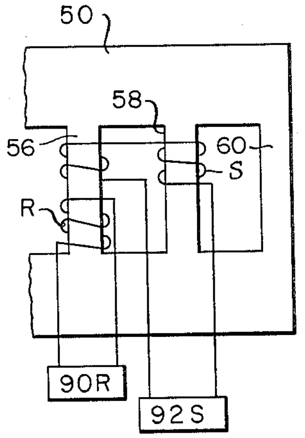

Referring to the FIG. 9, the right hand side of the core 50 is shown with an information input winding R on the leg 56 connected with an input signal source 90R and another information input winding S on the legs 56 and 58 connected with an input signal source 92S. This information input wiring configuration shows, by way of example, further sophistication of the input winding means which allows the performance of other logical functions. A Table III is shown below which symbolizes the inputs and the outputs similarly described for the Table II above.

*Table III*

| Inputs | | Legs having an output winding | | | | | |
|---|---|---|---|---|---|---|---|
| R | S | 56 | 58 | 60 | 56 58 | 56 60 | 58 60 |
| 1 | 1 | 0 | 0 | 1 | 0 | 1 | 1 |
| 0 | 1 | 0 | 0 | 1 | 0 | 1 | 1 |
| 1 | 0 | 0 | 1 | 0 | 1 | 0 | 1 |
| 0 | 0 | 1 | 0 | 0 | 1 | 1 | 0 |

As seen, an output winding linking the leg 56 alone, performs the function of NEITHER NOR, while an output winding on the leg 58 alone performs the function NOT THEN. Similarly, the functions of Singularly S, Singularly S with INVERSION, NOT IF THEN and INCLUSIVE OR performed. The device as described above may be further modified by providing another data leg which may be employed to generate several other ternary functions as well.

In view of the above described device an extension of the basic invention may be contemplated by utilization of toroidal cores to replace the multipath structure. Where "N" is equal to the number of data legs desired in any of the structures disclosed above, a circuit with "N" toroidal cores may be devised as shown in the FIG. 10 and the FIG. 11. The cores of these circuits are then referred to as data paths and could be of different diameters in order to obtain paths of unequal reluctance or, cores of the same diameter could be used if bias mmf's were employed. Yet another method of obtaining the same result may be accomplished by utilizing a different number of turns on the drive, or control winding, on each core. This latter technique also requires that a resistor of appropriate value be connected in series with the drive windings since the voltage across the windings will be a function of the number of turns. Considering all of the above techniques, it is then apparent that the resistor need not be used if the cross sectional area (A) of each core is made inversely proportional to the number of turns (W) as shown in the expression below.

$$A_1W_1=A_2W_2=A_3W_3=\ldots$$

Figure 10:
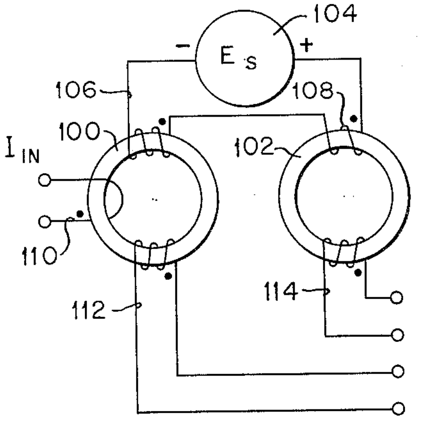
FIGS. 10 and 11 illustrate extensions of this invention depicting toroidal core circuitry equivalent to the multipath structure shown in the FIG. 1 and FIG. 6 showing a plurality of magnetic switching paths of unequal reluctance.

Referring now to the FIG. 10, a core 100 and a core 102 is provided, each having winding means. A control clock source 104 is provided series connected with a winding 106 on the core 100 and a winding 108 on the core 102. This circuit arrangement is such as to provide signals from the control clock source 104 as shown in the FIG. 13 which signals tend to switch the core 100 from a first limiting state to a second limiting state of magnetization, preferentially before similarly switching the core 102. This may be accomplished by utilization of any of the techniques described above. An information input winding 110 and an output winding 112 is further provided on the core 100, while an output winding 114 is provided on the core 102.

Again operation may be divided into input and output time. During input time, the control clock source 104 causes a current flow into the windings 106 and 108. This current flow is in such a direction as to switch the core 100 and 102 to the second limiting state, but since the core 100 is of less reluctance, the core 100 switches leaving the core 102 in the first limiting state. The core 100, in switching from the first to the second state, induces a voltage in the output winding 112 and the information input winding 110. As described above in the case of the multipath core, a uni-directional element, such as a diode may be provided to prevent spurious outputs in the input and output winding during input time, which element is here not shown since it may be incorporated in the input source or output load circuit. During output time, the control clock source 104 causes a reversed current flow which tends to switch the cores 102 and 100 toward the first limiting state. Since the core 102 is already in the first limiting state, there is negligible voltage drop across the winding 108, while the core 100 is reset to the first limiting state. Resetting the core 100 induces a voltage on the output winding 112 which is not utilized as an indication of a logical function. If, during input time, an information input to the winding 110 were provided which input is in such a direction as to bias the core 100 in the first limiting state and thus prevent the core 100 from switching, the core 102 alternatively switches from the first to the second limiting state. During output time, the core 102 is reset to induce a voltage on the output winding 114. The operation of this toroidal core circuit is seen to be similar to the operation of the multipath circuit as shown in the FIG. 5 and described above. The truth table would then be similar with logical functions provided as disclosed in the Table I.

Figure 11:
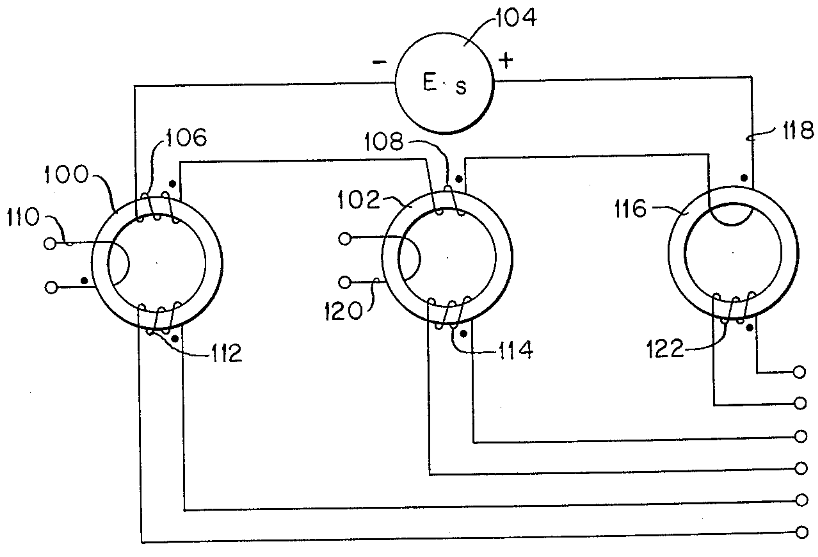

Referring to the FIG. 11, the cores 100 and 102 are again shown with the addition of a core 116 in the circuit. The control clock source 104 is connected in series with the control windings 106 and 108 on the core 100 and 102, respectively, and with a control winding 118 on the core 116. An information input winding 120 is provided on the core 102 and the information input winding 110 on the core 100. The output windings 112 and 114 are provided on the cores 100 and 102, respectively, with an output winding 112 provided on the core 116. In the circuit, the core 100 is the first preferential switching path, the core 102, the next preferential switching path, while the core 116 is the least preferential switching path. Operation of this circuit is then similar to that of FIG. 8 in that if an information input is provided to bias the core 100 at input time, the core 102 will be switched. If, however, an input is provided simultaneously to both the core 100 and 102 via their information input windings 110 and 120, respectively, the core 116 will then switch. It should be noted that in any given cycle, only one core is allowed to switch from one state to another, and thus, logical functions may then be accomplished by sophistication of the inputs and the output windings. For example, consider the circuit as shown with the addition of circuit means connecting the winding 112 with the winding 114, or the winding 112 with the winding 122, or, the winding 114 with the winding 122. The logical functions which may be achieved are the same as those described and shown in the Table II. If we were to connect the information input winding 120 on the core 102 with a further information input winding on the core 100 with sophistication of the output winding as above described, the circuit would perform the logical functions as described and shown in the Table III. Further cores may be added which in turn will allow achievement of various other ternary functions, or as many other functions as are theoretically desirable.

Figure 12:
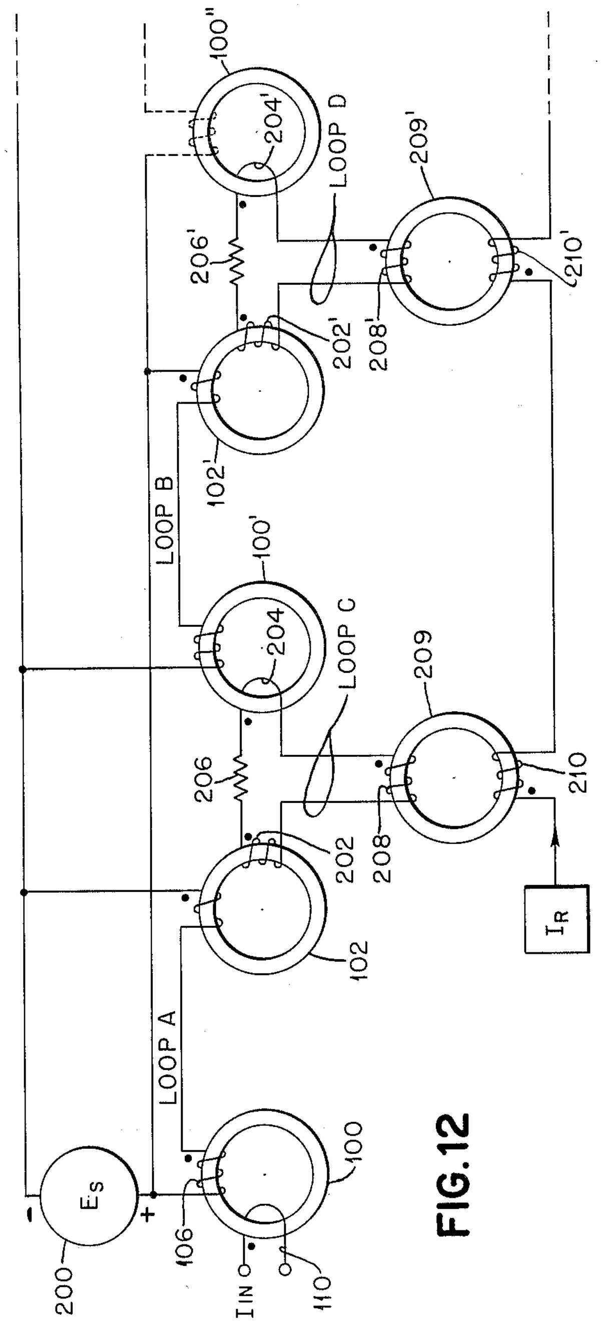
FIG. 12 is a schematic diagram of a shift register utilizing toroidal core structures in accordance with this invention.

Show in the FIG. 12 is a shift register which is the torodial core counterpart of the multipath shift register as described above and illustrated in the FIG. 4. Referring to the FIG. 12, a control clock source 200 is shown whose waveform is illustrated in the FIG. 14. The core 100 and 102 is again shown each with the control winding means 106 and 108, respectively, series connected with the control clock source 200 which interconnection is hereinafter referred to as loop A. Similarly, a core 100′ and a core 102′ are provided with control windings 106′ and 108′, respectively, series connected with the control clock source 200 and in parallel with the circuit including the control windings 106 and 108 which is hereinafter referred to as loop B. The information input winding 110 is provided on the core 100 and an output winding 202 is provided on the core 102. The output winding 202 on the core 102 is connected with an input winding 204 on the core 100′, through a resistor 206, and further connected with a control winding 208 and a core 209, which interconnection is hereinafter referred to as loop C. Similarly, the core 102′ is provided with an output winding 202′ interconnected with a winding 204′ on a core 100′ through a resistor 206′ and with a control winding 208′ on a core 209′ which interconnection is hereinafter referred to as loop A. The cores 209 and 209′ are coupling cores each made of material having a substantially rectangular hysteresis loop and are adapted to provide a means for unilaterial transfer of information from one stage to another in the register. The cores 209 and 209′ are each provided with a winding 210 and 210′, respectively, interconnected with an $I_R$ control clock pulse source. The $I_R$ control source is adapted to energize the windings 210 and 210′ simultaneously, to cause the cores 209 and 209′, respectively, to switch toward a datum residual state.

Figure 14:
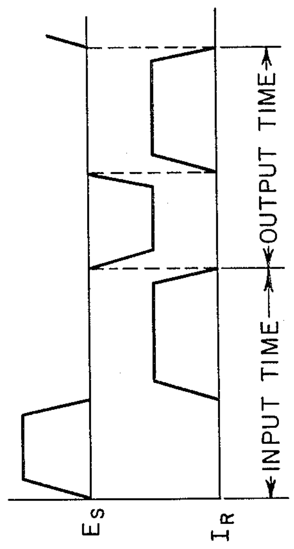
FIG. 14 illustrates substantially the voltage waveform as applied by the $E_s$ alternating clock source and the waveform as applied by the $I_R$ clock pulse source as shown in the FIG. 12.

The time of delivery of operating pulses by the $E_s$ control clock source 200 and the $I_R$ control clock pulse source, with reference to input and output time, is shown in the FIG. 14. To distinguish between pulses from the two control sources as applied to the circuit, reference will hereinafter be made to $E_s$ input time, $I_R$ input time, $E_s$ output time and $I_R$ output time.

Assuming that the core 100′ is in the state "*a*" while the remaining cores are in the state "*b*" as shown in the FIG. 2, operation of the register will first be described in the absence of input information. At $E_s$ input time, a counterclockwise current flows in the loop A and a clockwise current flows in the loop B due to the operation of the $E_s$ control clock pulse source which is positive at this time. This counterclockwise current in loop A tends to switch the cores 100 and 102 to the state "*a*," but due to the greater number of turns in the winding 106 as compared with the number of turns in the winding 108, the core 100 is preferentially switched from the state "*b*" to the state "*a*." Coincidently, the clockwise current in the loop B tends to reset the cores 100′ and 102′ to the state "B." Since the core 102′ is already in the state "*b*," the core 100′ is reset toward the "*b*" state. The core 100′ in being reset induces a voltage in the input winding 204 which causes a counter-clockwise current in the loop C. This current in the loop C is such as to switch the core 102 toward the "*b*" state and to switch the core 209 toward the "*a*" state. The number of turns in the winding 204 is small in comparison with the number of turns in the windings 202 and 208 on the cores 102 and 209, respectively, so that the induced voltage in the winding 204 is not great enough to cause switching of the core 209 and is therefore dissipated in the resistance 206. At the termination of the $E_s$ input clock pulse, the $I_R$ control clock pulse source, at $I_R$ input time, directs a signal into the windings 210 and 210′ on the cores 209 and 209′, respectively, which tends to switch both cores to the "*b*" state. Since both the cores 209 and 209′ are already in the "*b*" state, no appreciable change takes place other than to drive the cores further into saturation. At $E_s$ output time, the $E_s$ clock pulse is negative to provide a clockwise current in the loop A and a counter-clockwise current in the loop B. The clockwise current in the loop A tends to reset each of the cores 100 and 102 toward the "*b*" state. Since the core 102 is already in the "*b*" state, and the core 100 was left in the "*a*" state at the termination of the $I_R$ clock pulse, the core 100 is switched to the "*b*" state. Coincidently, the counter-clockwise current in the loop B tends to switch the cores 100′ and 102′ to the "*a*" state. The core 100′ is then preferentially switched toward the "*a*" state due to the greater number of turns in the winding 106′ than in the winding 108′.

The core 100′, in switching toward the "a" state, induces a voltage in the winding 204 which causes a clockwise current in the loop C. This current in loop C has no effect since the number of turns in the winding 204 as compared with the number of turns in the windings 202 and 203 is small and therefore the voltage induced in the winding 204 is not sufficient to affect the core 209 or the core 102. At $I_R$ output time, the $I_R$ control clock pulse source delivers a signal into the windings 210 and 210′ on the cores 209 and 209′, respectively, which tends to reset each of the cores to the "b" state. Since the cores 209 and 209′ are already in the "b" state negligible change takes place.

Assume, during the next cycle of operation, an input signal is available during $E_s$ input time and is directed into the winding 110 on the core 100, which signal tends to switch the core 100 to the "b" state. At $E_s$ input time there is a counter-clockwise current in the loop A and a clockwise current in the loop B due to the operation of the $E_s$ control clock pulse source. As before, the counter-clockwise current in loop A tends to switch the core 100 preferentially towards the "a" state, however, the input which is coincidently applied to the winding 110 biases the core 100 toward the "b" state allowing the core 102 to switch toward the "b" state. The core 102 in switching induces a voltage in the winding 202 which causes a counter-clockwise current in the loop C. Coincidently, the current in loop B resets the core 100′ to the "b" state and in so doing induces a voltage in the winding 204 which causes a counter-clockwise current in the loop C. This counter-clockwise current in loop C switches the core 209 from the "b" state to the "a" state. At $I_R$ input time, the $I_R$ control clock pulse source directs a signal into the windings 210 and 210′ on the cores 209 and 209′ which tends to switch both cores to the "b" state. The core 209 then switches to the "b" state and in so doing induces a voltage in the winding 208 which causes a counter-clockwise current in the loop C tending to switch the core 100′ to the "a" state and reset the core 102 and the "b" state. Resetting of the core 209 by the $I_R$ control clock pulse is done slowly so the current in the loop C at this time does ont exceed threshold for the cores 100′ or 102. At $E_s$ output time, the $E_s$ control clock pulse is negative to cause a clockwise current in the loop A and a counter-clockwise current in the loop B. The current in the loop A tends to reset each of the cores 100 and 102 to the "b" state and since the core 100 is already in this state, the core 102 is reset. The core 102 in switching induces a voltage in the winding 202 which causes a clockwise current in the loop C which tends to switch each of the cores 100′ and 209 toward the "b" state. Coincidently, the current in loop B tends to switch the core 100′ toward the "a" state, but because of the bias applied to the winding 204 on the core 100′ provided by the switching of the core 102, the core 100′ is held in the "b" state to allow the core 102′ to switch toward the "a" state. The energy provided by the current in the loop C is then dissipated in the resistor 206 since the core 209 is already in the "b" state. The core 102′ in switching induces a voltage in the winding 202′ causing a counter-clockwise current in the loop D which switches the core 209′ to the "a" state preferentially, due to the greater number of turns in the winding 208′ as compared with the number of turns in the winding 204′ on the cores 209′ and 100′, respectively. Thus, information has been shifted from stage to stage, the output of which may be obtained by providing a winding properly linking any of the 100 cores.

It should be apparent from the above description of the preferred embodiments of the invention that the inventive principles set forth may be applied to provide circuits capable of generating any number of logical outputs from any number of input variables. The structures shown may be extended to include N number of flux paths to perform desired logic with a number of input variables. Further, it has been shown in each of the embodiments that the change in magnetic states is sensed during output time, but it is clear, that if desired, this change may also be sensed during input time or, an alternating output may be obtained. It is therefore clear, that while there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A device comprising a magnetic core made of substantially rectangular hysteresis loop material having a data portion and a control portion, said core having an aperture dividing said control portion into a first and a second part, a source of fixed A.C. signals coupled to the first part of said control portion, an individual output winding coupling a part of said data portion, an input winding coupling a part of said data portion adapted to be selectively energized and saturate the part of said core coupled, and means for continuously saturating the second part of said control portion in one direction of flux orientation to cause an A.C. signal to be produced on said output winding in response to the signals from said source and under control of said selectively energized input winding.

2. In a magnetic circuit made of substantially rectangular hysteresis loop material having an aperture dividing said circuit into different flux paths of unequal reluctance, a plurality of data windings coupling portions of said circuit remote from said aperture including an input data winding, means selectively energizing said data input winding for saturating the portion of said circuit coupled, a control winding threaded through said aperture and coupling the material of said circuit adjacent one side of said aperture, a source of fixed A.C. connected to said control winding, and means for continuously saturating the material of said circuit adjacent another side of said aperture in one direction of flux orientation to cause an A.C. output to be produced in a predetermined one of said plurality of data windings under control of the energization of said data input winding.

3. The circuit of claim 2, wherein said input data winding couples the portion of said core remote from said aperture defining the flux path of least reluctance.

4. A device comprising a magnetic core made of substantially rectangular hysteresis loop material having a data portion and a control portion wherein the cross sectional area of material in said data portion is substantially equal to the cross sectional area in said control portion, said core having an aperture dividing said control portion into a first and second part, a control winding threaded through said aperture and coupling the first part of said control portion, a bias winding threaded through said aperture and coupling the second part of said control portion, an output winding coupled to a part of said data portion, a source of fixed A.C. signals connected to said control winding, and means for continuously energizing applying a D.C. to said bias winding to couple said control and output winding and cause an A.C. signal to be produced on said output winding in response to the signals from said source.

5. In a magnetic circuit made of substantially rectangular hysteresis loop material having an aperture dividing said circuit into different flux paths of unequal reluctance, an output winding coupling a portion of said circuit remote from said aperture, a control winding threaded through said aperture and coupling the material of said circuit on one side of said aperture, a bias winding threaded through said aperture and coupling the material of said circuit opposite the one side of said aperture, means for applying to said control winding a source of fixed A.C. signals, and said bias winding adapted to be continuously energized to saturate the material of said circuit coupled in one direction of flux orientation to cause A.C. output signals to be produced on said output winding in response to the energization of said control winding by said source.

6. A universal device comprising, a core made of magnetic material exhibiting a substantially rectangular hysteresis characteristic, said core having a data portion and a control portion, said control portion having an aperture dividing said control portion into a first and second part, a fixed A.C. source coupled to the first part of said control portion, a plurality of input windings coupling different parts of said data portion in accordance with a first predetermined combination and adapted to be selectively energized to cause those parts of said data portion coupled by the input windings energized to be saturated in one direction of flux orientation, a plurality of output windings coupling different parts of said data portion in accordance with a second predetermined combination, and means for continuously saturating the second part of said control portion in an opposite direction of flux orientation to cause an A.C. signal to be produced on one of said output windings under control of the energization of said input windings.

7. A logical device comprising a magnetic core made of material exhibiting a substantially rectangular hysteresis loop having a central aperture and defining a control portion and a data portion of said core, said core having a first secondary aperture dividing the control portion of said core into a first and a second control leg, said core having a second and third secondary aperture dividing said data portion into a first, second, and third data leg, a source of fixed A.C. signals coupled to the first control leg, a plurality of input windings coupling said data legs in accordance with a first predetermined combination and adapted to be selectively energized to saturate the data legs coupled in one direction of flux orientation, a plurality of output windings coupling said data legs in accordance with a second predetermined combination, and means for continuously saturating the second control leg in an opposite direction of flux orientation whereby an A.C. signal is induced in one of said output windings under control of the said selectively energized input windings.

8. The device as set forth in claim 7, wherein the cross-sectional area of each said data leg and said first control leg is similar.

9. The device as set forth in claim 8 wherein the cross-sectional area of said control portion is equal to the cross-sectional area of the data portion of said core.

References Cited in the file of this patent

UNITED STATES PATENTS

| | | |
|---|---|---|
| 2,519,426 | Grant | Aug. 22, 1950 |
| 2,803,812 | Rajchman et al. | Aug. 20, 1957 |
| 2,827,573 | Eckert | Mar. 18, 1958 |
| 2,851,675 | Paivinen | Sept. 9, 1958 |
| 2,852,699 | Ruhman | Sept. 16, 1958 |
| 2,863,136 | Abbott et al. | Dec. 2, 1958 |
| 2,868,451 | Bauer | Jan. 13, 1959 |
| 2,869,112 | Hunter | Jan. 13, 1959 |
| 2,898,581 | Post | Aug. 4, 1959 |
| 2,919,430 | Rajchman | Dec. 29, 1959 |
| 2,953,739 | Duinker | Sept. 20, 1960 |
| 2,969,523 | Kelley | Jan. 24, 1961 |
| 2,978,176 | Lockhart | Apr. 4, 1961 |